United States Patent [19]

Takahashi

[11] Patent Number: 5,009,293

[45] Date of Patent: Apr. 23, 1991

[54] DISC BRAKE APPARATUS

[75] Inventor: Nobuyuki Takahashi, Saitama, Japan

[73] Assignees: Akebono Brake Industry Co., Ltd., Tokyo; Akebono Research and Development Centre Ltd., Hanyu, both of Japan

[21] Appl. No.: 448,847

[22] Filed: Dec. 12, 1989

[30] Foreign Application Priority Data

Dec. 21, 1988 [JP] Japan ............................... 63-164472

[51] Int. Cl.$^5$ ............................................. F16D 55/18
[52] U.S. Cl. ............................... 188/72.4; 188/264 G; 188/71.5; 188/370
[58] Field of Search ................ 188/71.5, 71.6, 264 G, 188/72.4, 370, 366, 367

[56] References Cited

U.S. PATENT DOCUMENTS

| | | | |
|---|---|---|---|
| 2,071,788 | 2/1937 | Gillett | 188/71.5 X |
| 2,555,182 | 5/1951 | Butler | 188/71.5 X |
| 2,657,773 | 11/1953 | Driscoll | 188/71.5 X |
| 2,801,714 | 8/1957 | Dotto | 188/264 G X |
| 3,038,559 | 6/1962 | Hirzel | 188/71.5 |
| 3,044,579 | 7/1962 | Klau | 188/71.6 |
| 4,147,241 | 4/1979 | Preniczny et al. | 188/264 G |

Primary Examiner—Douglas C. Butler
Attorney, Agent, or Firm—Cushman, Darby & Cushman

[57] ABSTRACT

A multiple disc brake apparatus provided with at least one rotor rotatable with a vehicle wheel, a housing secured to an unrotatable portion of the vehicle, at least two pads supported by the housing and located on both sides of the rotors, a cylinder member secured to the housing, and a piston member mounted on the cylinder member to urge each pad against a frictional surface of the rotor responsive to a supply of a pressurized brake fluid to the cylinder. The cylinder member includes a main part fitted sealably in the cylinder member, a sub-part disposed between the main part and the pads, and a first heat-resistant member provided between the main part and the sub-part, in such a manner that the main part, the first heat-resistant member and the sub-part are arranged in series. The cylinder member is independently provided from the housing, and the cylinder member is fixedly secured to the housing through a second heat-resistant member.

5 Claims, 1 Drawing Sheet

DISC BRAKE APPARATUS

BACKGROUND OF THE INVENTION

1. Field of the Invention

The present invention relates to an improved disc brake and, more particularly, to an improvement of a multiple disc brake for use in a large-size vehicle such as a bus or truck which generates heat due to friction.

2. Description of the Related Art

There has been known a multiple disc brake apparatus for use in a large-size vehicles such as buses and trucks, in which apparatus at least two rotors and at least three pads are alternately arranged.

The construction and operation of the conventional multiple disc brake apparatus will be described with reference to FIGS. 1 and 2 which show also an embodiment of the present invention.

A shaft 1 rotates together with a vehicle wheel. A hub 2 is mounted on an outer periphery of the shaft 1 such that the hub 2 is unrotatable with respect to the shaft 1. Two annular rotors 3 are engaged with a serration engaging portion $S_1$ provided between an outer peripheral surface of the hub 2 and an inner peripheral surface of each of the rotors 3, so that the rotors 3 are movable in a direction of a longitudinal axis of the shaft 1.

A housing 4 is secured to an unrotatable portion of the vehicle such as a suspension mechanism. Three annular pads 5a and 5b are engaged with a serration engaging part $S_2$ provided between an inner peripheral surface of the housing 4 and an outer peripheral surface of each of the pads 5a and 5b, so that the pads 5a, 5b are movable in the direction of the longitudinal axis of the shaft 1. The inner and outer pads 5a comprise a rear plate 7 and a friction member 6 secured to the rear plate 7. The center pad 5b comprises merely of a friction member 6. The pads 5a, 5b and the rotors 3 are alternately arranged in such a manner that the three pads 5a, 5b sandwich the two rotors 3.

Four cylinder members 8 (only one is described in FIG. 1) are mounted on the housing 4 at an equal interval in a circumferential direction thereof. A piston 9 is urged against the pads 5a, 5b by supplying a pressurized brake fluid to the interior of the cylinder member 8 through a fluid supply pipe 10 fitted to the cylinder member 8.

The conventional disc brake apparatus is further provided with a cylinder member air discharging valve 11 and bearings 12 which allow the shaft 1 to rotate with respect to the housing 4.

In the multiple disc brake apparatus thus constructed, when the pressurized brake fluid is supplied to the cylinder member 8 through the fluid supply pipe 10, the piston 9 is forced from the cylinder member 8 so that the rotors 3 and the friction members 6 of the pads 5a, 5b are strongly urged against each other to produce a frictional force which is supplied to the shaft 1 as a braking force. During the braking operation, a brake torque is transmitted to the housing 4 through the serration engaging member $S_2$.

The conventional multiple disc brake apparatus thus constructed suffers from the following problems.

During the braking operation, heat is generated by a frictional engagement between the rotors 3 and the pads 5a, 5b. When the braking operation is actuated while the vehicle is travelling at a high speed, or when the braking operation is frequently actuated while the vehicle travels down a mountain road, the heat generated during the braking operation will be excessively large. Therefore, the conventional brake apparatus suffers from a vapor lock phenomenon caused by a vaporization of the brake fluid when the heat is transmitted to the brake fluid in the cylinder member 8.

Unexamined Japanese Patent Application (OPI) No. 61-149624 discloses a brake apparatus in which a housing is separately provided from a cylinder member. However, it does not teach or suggest that the heat generated during the braking operation is to be prevented from being transmitted to the cylinder member.

Further, Japanese Patent No. 46-17846 discloses a brake apparatus in which a heat-resistant member is provided between a housing and a pad and between a piston and the pad. However, in this Japanese patent, a large torque produced during the braking operation is applied to the heat-resistant member. Therefore, the brake apparatus of this Japanese patent would be poor in durability and reliability.

SUMMARY OF THE INVENTION

The present invention was made in view of the aforementioned problems accompanying the conventional brake apparatus. Accordingly, an object of the present invention is to provide a durable and reliable multiple disc brake apparatus capable of preventing an excessive heat generated during the braking operation from being transmitted to a brake fluid.

The above object can be achieved by the provision of a multiple disc brake apparatus which, according to the invention, is provided with at least one rotor rotatable with a vehicle wheel, a housing secured to an unrotatable portion of the vehicle, at least two pads supported by the housing and located on both sides of the rotors, a cylinder means secured to the housing, and a piston means mounted on the cylinder means which urges each pad against a frictional surface of the rotor responsive to a supply of a pressurized brake fluid to the cylinder means.

According to the present invention, the cylinder means comprises of a main part fitted sealably in the cylinder means, a sub-part disposed between the main part and the pads, and a first heat-resistant means provided between the main part and the sub-part, in such a manner that the main part, the first heat-resistant means and the sub-part are arranged in series. Further, the cylinder means is independently provided from the housing, and the cylinder means is fixedly secured to the housing through a second heat-resistant means.

The braking operation itself of the multiple disc brake apparatus according to the present invention is as the same as that of the conventional apparatus. However, the heat produced during the braking operation is prevented from being transmitted from the housing to the brake fluid in the cylinder means by the second heat-resistant means, and the heat is also prevented from being transmitted from the piston to the brake fluid by the first heat-resistant means.

As a result, even if heat is produced to a large extent during the braking operation, the brake fluid in the cylinder means does not excessively increase in temperature, so that the vapor lock phenomenon is effectively eliminated.

DESCRIPTION OF THE PREFERRED EMBODIMENT

A preferred embodiment of the present invention will now be described in detail with reference to the accompanying drawings.

Figure 1:
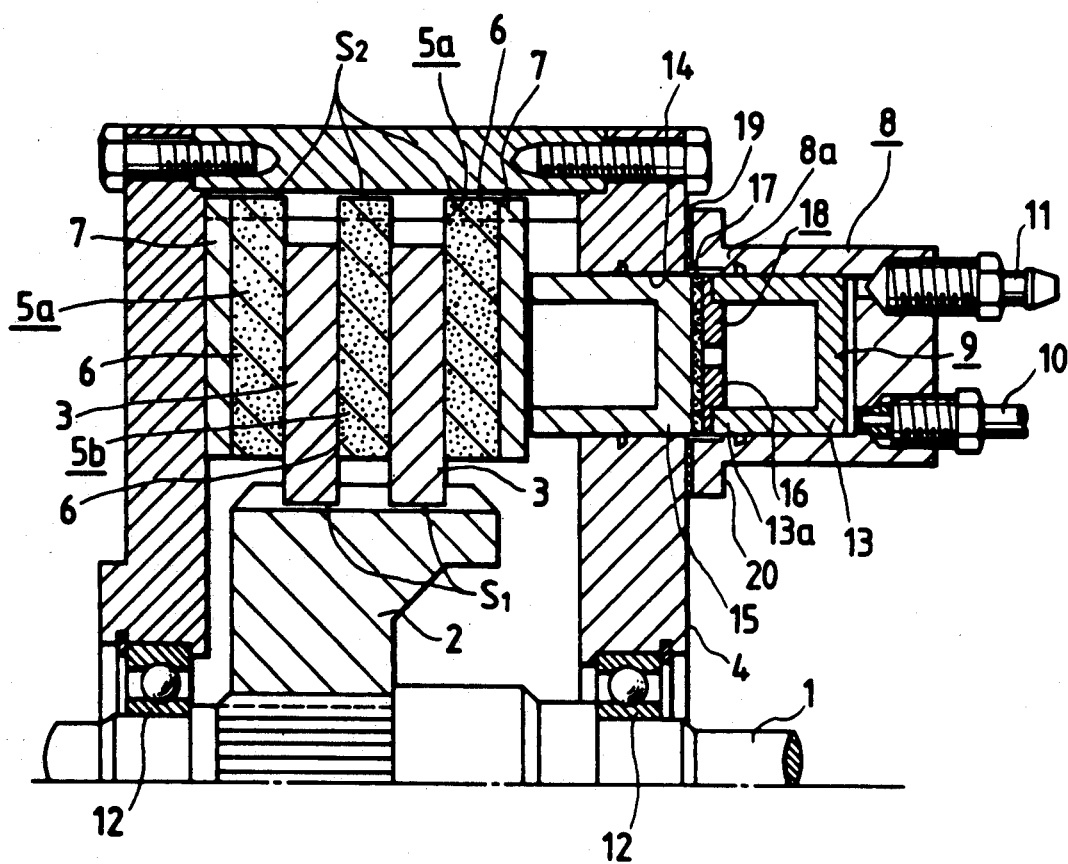
FIG. 1 is a partially sectional view of a disc brake apparatus to which an embodiment of the invention is applied.
Figure 2:
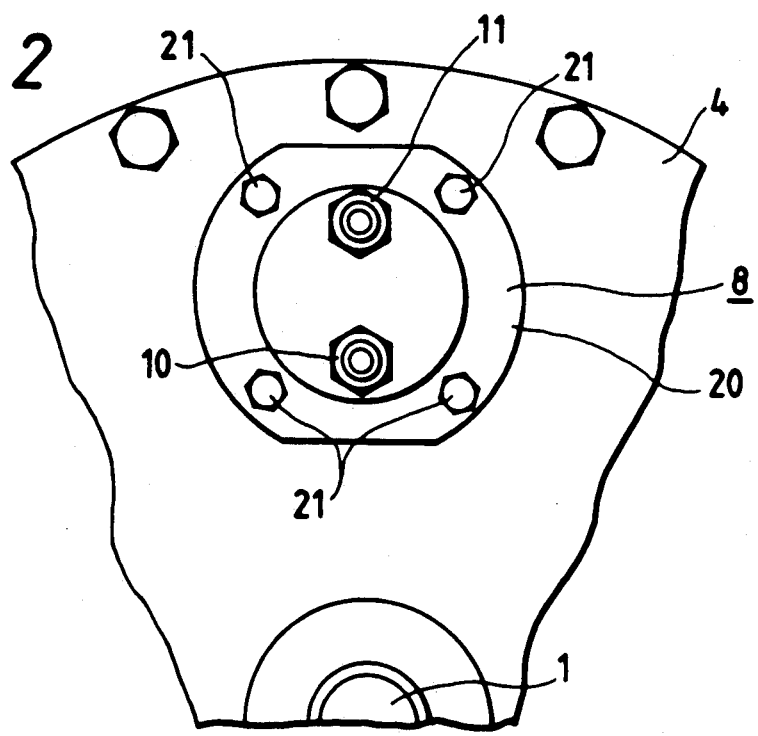
FIG. 2 is a right-side view of the apparatus shown in FIG. 1.

FIG. 1 is a partial sectional view showing a multiple disc brake apparatus according to an embodiment of the invention, and FIG. 2 is a right-side view of the apparatus shown in FIG. 1.

The description below is directed only to feature portions of the present invention while the other portions are omitted from the explanation because they are of the same construction and function as that of the conventional apparatus.

A piston 9 is sealably fitted in each of four cylinder members 8 (only one is described in FIG. 1) which are arranged at equal intervals to a circumferencial direction of a housing 4. The piston 9 comprises by a main part 13 which is sealably fitted in the cylinder 8 and a sub-part 15 mounted in a circular opening 14 formed at a side surface of the housing 4 and axially movably supported thereby. The main part 13 and the sub-part 15 are arranged in series.

The cup-shaped main part 13 has an opening 13a to which a block 18 is fitted. The block 18 is provided with a socket 16 fitted to the opening 13a and a first heat-resistant member 17 attached to the socket 16 at the front side (left side in FIG. 1) thereof, so that the first heat-resistant member 17 abuts against a bottom surface of the sub-part 15.

The cylinder member 8 to which the main part 13 of the piston 9 is sealably fitted is independently formed from the housing 4, and the cylinder member 8 is fixedly secured to the housing 4 through a second heat-resistant member 19. That is, the cup-shaped cylinder member 8 is provided with an opening 8a and a flange 20 extending outerward from the opening 8a. The flange 20 of the cylinder member 8 is fixedly secured to the outer surface of the housing 4 by bolts 21. The second heat-resistant member 19 is provided between the flange 20 and the housing 4 so that the housing 4 and the cylinder member 8 which are both formed of metal, do not contact directly to each other.

The braking operation of the braking apparatus of the present invention is entirely the same as that of the conventional brake apparatus. That is, by supplying a pressurized brake fluid to the cylinder member 8 through the fluid supply pipe 10, the piston 9 comprising the main part 13 and the sub-part 15 is forced towards the two rotors 3 and three pads 5a arranged alternately, so that the vehicle wheel secured to a shaft 1 braked by a frictional force produced between the rotors 3 and the pads 5a.

However, according to the present invention, if heat is generated by the friction between the rotors 3 and the pads 5a during the braking operation, such heat is prevented from being transmitted to the brake fluid in the cylinder member 8 through the housing 4 supporting the pads 5a by the second heat-resistant member 19. Further, the heat is prevented from being transmitted to the brake fluid through the piston 9 by the first heat-resistant member 17 disposed between the main part 13 and the sub-part 15 of the piston 9.

As a result, the brake fluid in the cylinder member 8 does not excessively increase in temperature if heat is generated during the braking operation.

According to the embodiment of the invention described above, the four cylinder members 8 are provided at an equal interval in a circumferential direction of the housing 4 and, therefore, correspondingly, there are four main parts 13, sub-parts 15 and first and second heat-resistant members 17 and 19. However, the number of these components is not limited thereto or thereby. For example, six or eight members can be provided.

Further, each of the cylinder members 8, main parts sub-parts 15 and first and second heat-resistant members 17 and 19 can be formed by an annular single member.

As described above, according to the brake apparatus of the invention, brake fluid in the cylinder member is effectively prevented from excessively increasing in temperature.

Therefore, the disc brake apparatus of the invention does not suffer from a problems caused by the vapor lock phenomenon. Further, since the parts to which a large torque is applied during the braking operation can be formed of a metal which is the same as the conventional brake apparatus, the disc brake apparatus of the invention is improved in durability and reliability.

What is claimed is:

1. A disc brake apparatus for a vehicle having a vehicle wheel, the apparatus comprising:
   at least one rotor rotating with the vehicle wheel;
   a housing provided on an unrotatable portion of the vehicle;
   at least two pads supported by said housing, said pads being located at both sides of said rotor;
   a cylinder comprising a flange having a plurality of apertures, aid cylinder secured to said housing by a plurality of threaded fasteners passing through said apertures to engage said flange;
   a piston means engaging said cylinder for urging said pads against said rotor, said piston means comprising a main part fitted sealably in said cylinder and a sub-part slidably mounted in a circular aperture in the housing, said sub-part being provided between said main part and said pads, and a first heat-resistant member provided between said main part and said sub-part to prevent the transfer of heat from the sub-part to the main part, said main part, said first part and said sub-part to prevent the transfer of heat from the sub-part to the main part, said main part, said first heat-resistant member and said sub-part being arranged in series, said first heat resistant member completely separating said sub-part from said main part; and
   a second heat-resistant member provided between said cylinder and flange and said housing to prevent the transfer of heat from the housing to the cylinder.

2. THe disc brake apparatus of claim 1, wherein said cylinder comprises a plurality of cylinder members provided at an equal interval in a circumferential direction of said housing, the number of said cylinder members corresponds to that of said piston means, first and second heat-resistant member.

3. The disc brake apparatus of claim 1, wherein each of said cylinder, piston means and first and second heat-resistant members is formed by an annular single member.

4. The disc brake apparatus of claim 1, wherein said main part of said piston means is cup-shaped, and said first heat-resistant member is fitted in an opening of said main part.

5. The disc brake apparatus of claim 4, further comprising a socket fitted in said opening of said main part of said piston member, wherein said first heat-resistant means is attached to a front surface of said socket.

* * * * *